United States Patent
Buntz et al.

(10) Patent No.: US 11,069,908 B2
(45) Date of Patent: Jul. 20, 2021

(54) FLOW PLATE FOR A HUMIDIFIER

(71) Applicant: REINZ-DICHTUNGS-GMBH, Neu-Ulm (DE)

(72) Inventors: Werner Buntz, Muehlhausen (DE); Rainer Glueck, Dornstadt (DE); Andre Speidel, Orsenhausen (DE); Thomas Stoehr, Laupheim (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 185 days.

(21) Appl. No.: 16/335,882

(22) PCT Filed: Sep. 22, 2017

(86) PCT No.: PCT/EP2017/074119
§ 371 (c)(1),
(2) Date: Mar. 22, 2019

(87) PCT Pub. No.: WO2018/055130
PCT Pub. Date: Mar. 29, 2018

(65) Prior Publication Data
US 2019/0260044 A1    Aug. 22, 2019

(30) Foreign Application Priority Data
Sep. 23, 2016    (DE) .................... 20 2016 105 311.0

(51) Int. Cl.
*H01M 8/04119*    (2016.01)
*B01D 63/08*    (2006.01)
*B01D 65/08*    (2006.01)

(52) U.S. Cl.
CPC ...... *H01M 8/04149* (2013.01); *B01D 63/082* (2013.01); *B01D 65/08* (2013.01); *B01D 2313/14* (2013.01)

(58) Field of Classification Search
None
See application file for complete search history.

(56) References Cited

U.S. PATENT DOCUMENTS

| 3,323,653 | A  | 6/1967 | Lacey |
| 6,220,497 | B1 | 4/2001 | Benz  |

(Continued)

FOREIGN PATENT DOCUMENTS

| CN | 1457268 A   | 11/2003 |
| CN | 101098021 A | 1/2008  |

(Continued)

OTHER PUBLICATIONS

European Patent Office, International Search Report and written opinion issued in application PCT/EP2017/074119, dated Nov. 28, 2017, 16 pages.

(Continued)

*Primary Examiner* — Jason M Greene
(74) *Attorney, Agent, or Firm* — McCoy Russell LLP

(57) ABSTRACT

A flow plate for a humidifier, and to such a humidifier having a plurality of flow plates and water exchange membranes are described. The flow plate has a flow field with a plurality of free-standing support elements, wherein the support elements extend, at least in sections, perpendicular to the flat surface plane of the flow plate. Gas to be humidified or gas giving off moisture flows on the flow field. In the humidifier, the flow plates are arranged in a stack, wherein a membrane composite having at least one water exchange membrane is arranged between each pair of adjacent flow plates in the stack. The support elements improve the performance of the humidifier and therefore the number of flow plates can be reduced, making a lower-weight and space-saving design possible.

24 Claims, 10 Drawing Sheets

(56) References Cited

U.S. PATENT DOCUMENTS

| | | |
|---|---|---|
| 2005/0233040 A1 | 10/2005 | Ehrfeld |
| 2008/0290031 A1* | 11/2008 | Popa .................... B01D 63/082 210/650 |
| 2010/0326914 A1 | 12/2010 | Drost |
| 2015/0180059 A1* | 6/2015 | Vanderwees ......... B01D 63/085 261/102 |
| 2015/0314241 A1 | 11/2015 | Hester |
| 2017/0056788 A1* | 3/2017 | Liu ...................... B01D 63/087 |

FOREIGN PATENT DOCUMENTS

| | | |
|---|---|---|
| CN | 101584960 A | 11/2009 |
| CN | 103392097 A | 11/2013 |
| DE | 3127475 | 4/1982 |
| DE | 102013208877 | 11/2013 |
| DE | 102013004799 | 9/2014 |
| DE | 102014100659 | 7/2015 |
| DE | 202014006480 | 11/2015 |
| WO | 2013022945 | 2/2013 |
| WO | 2014033052 | 3/2014 |
| WO | 2016020550 | 2/2016 |

OTHER PUBLICATIONS

European Patent Office, International Search Report and Written Opinion in Application PCT/EP2017/074118, dated Nov. 16, 2017, 14 pages.

European Patent Office, International Search Report with Written Opinion issued in PCT/EP2017/074126, dated Nov. 28, 2017, 27 pages, European Patent Office, Rijswijk, Netherlands.

China National Intellectual Property Administration, Office Action and Search Report Issued Application No. 201780072467.9, dated Mar. 25, 2021, 16 pages.

\* cited by examiner

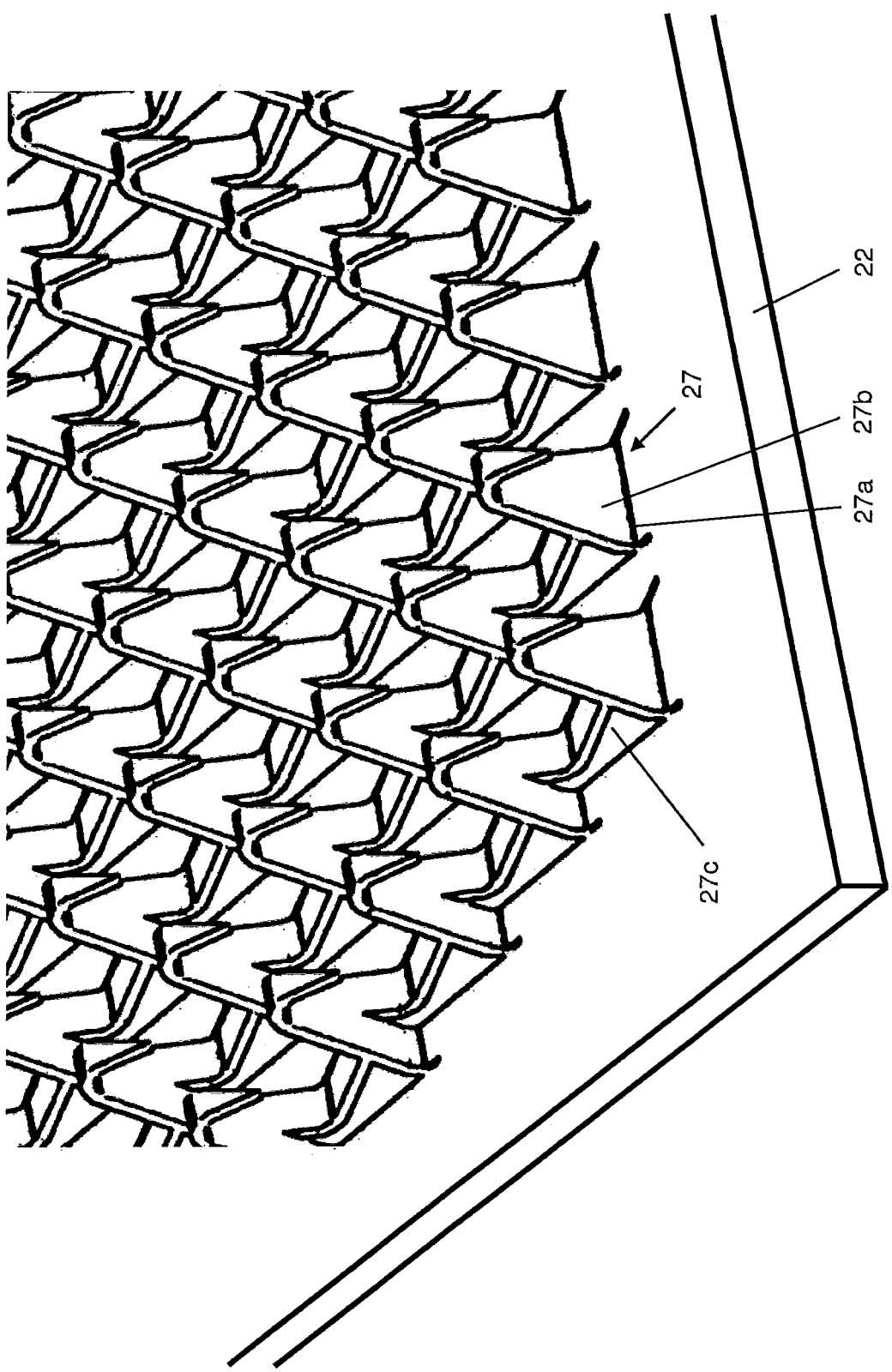

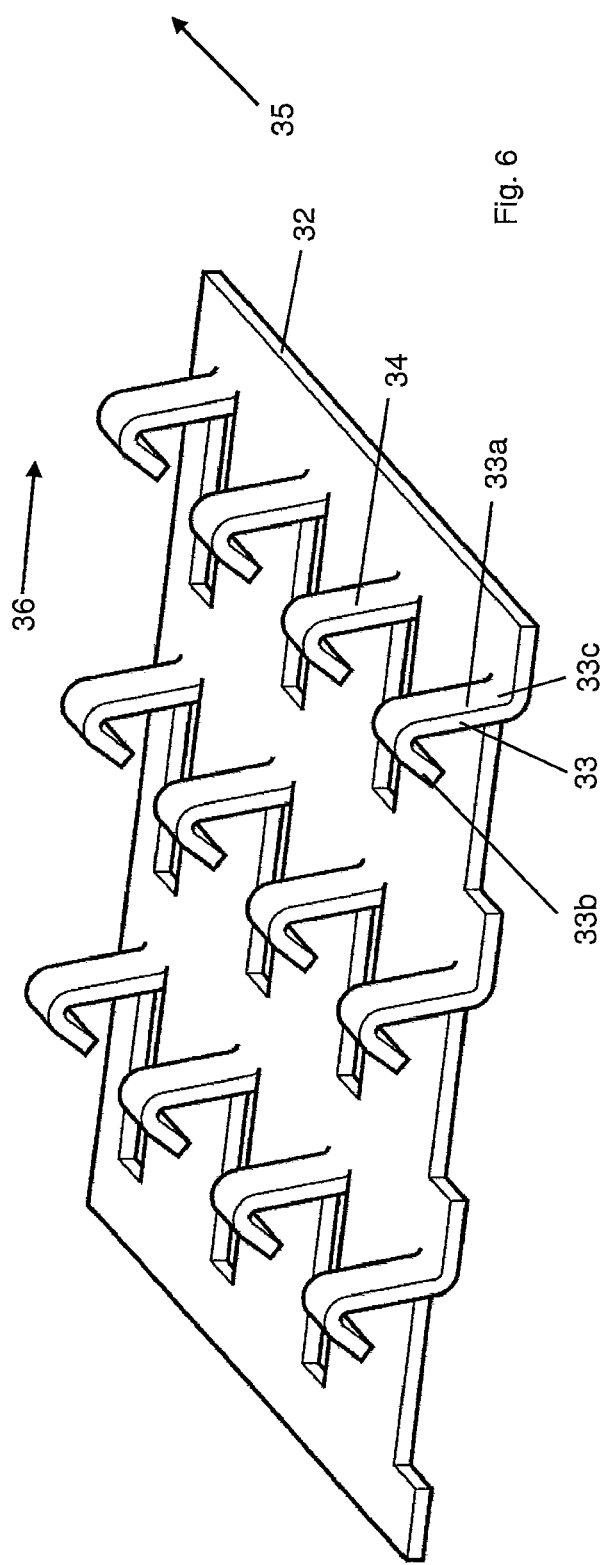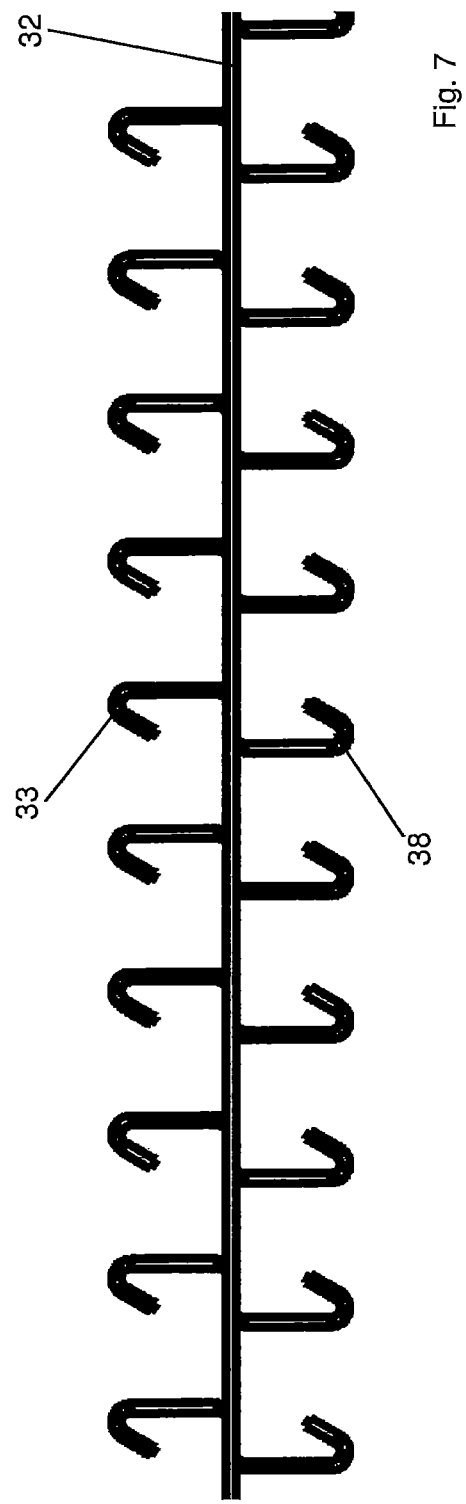

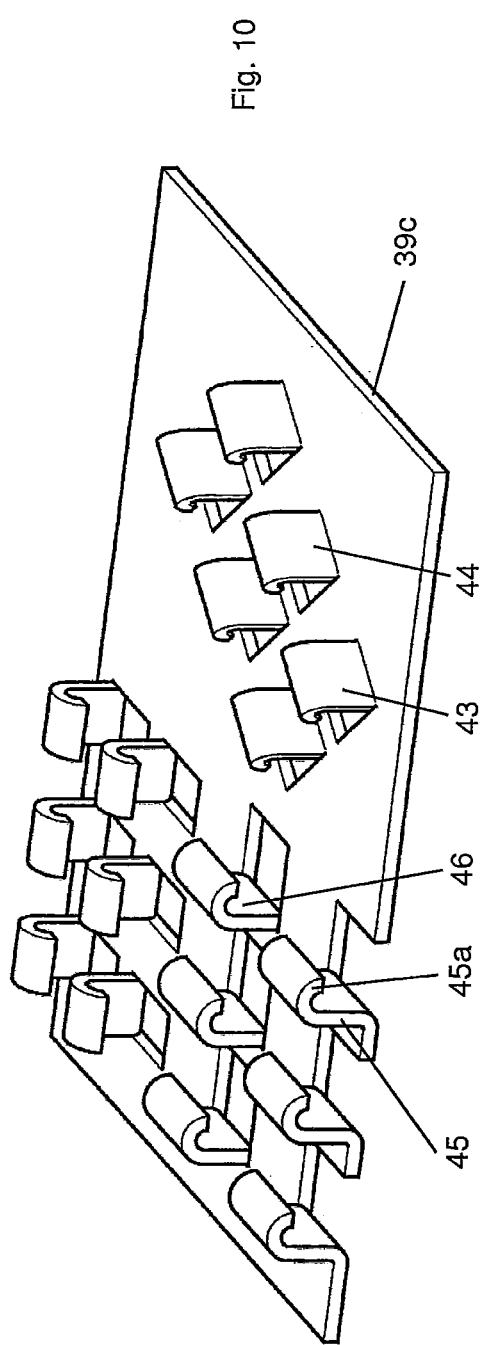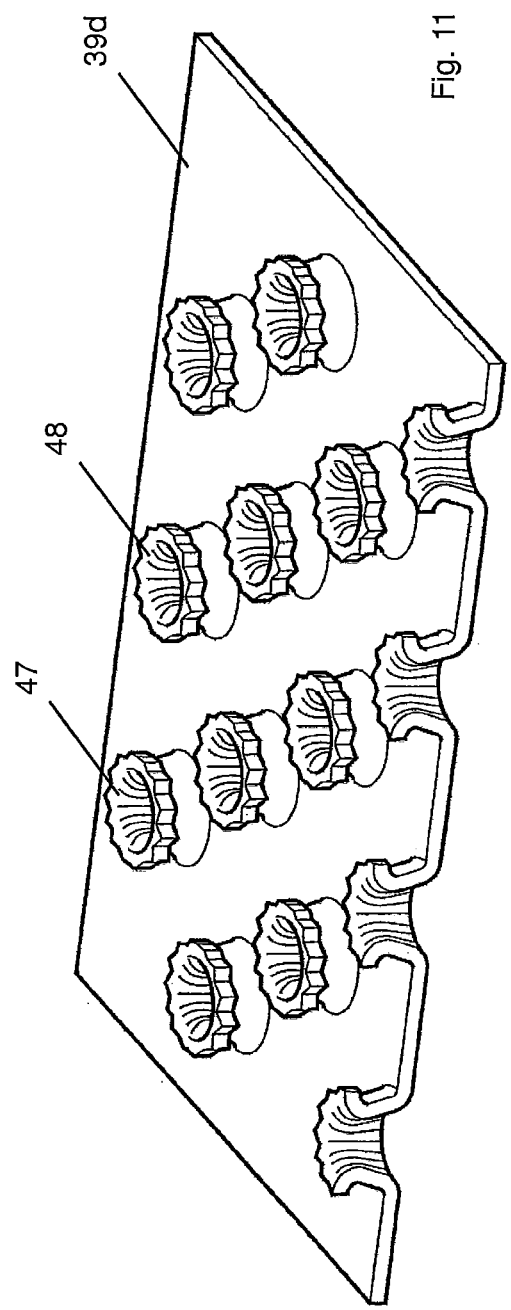

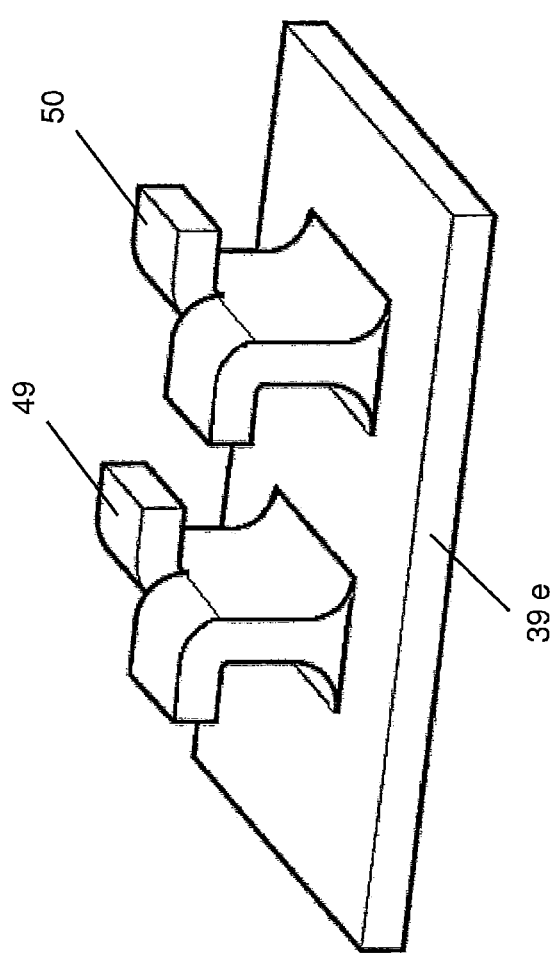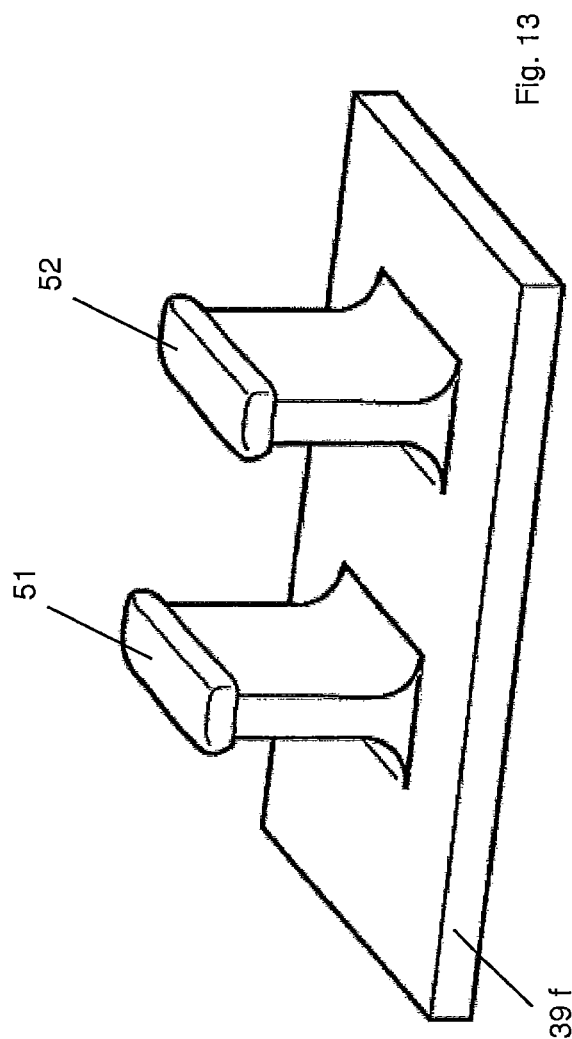

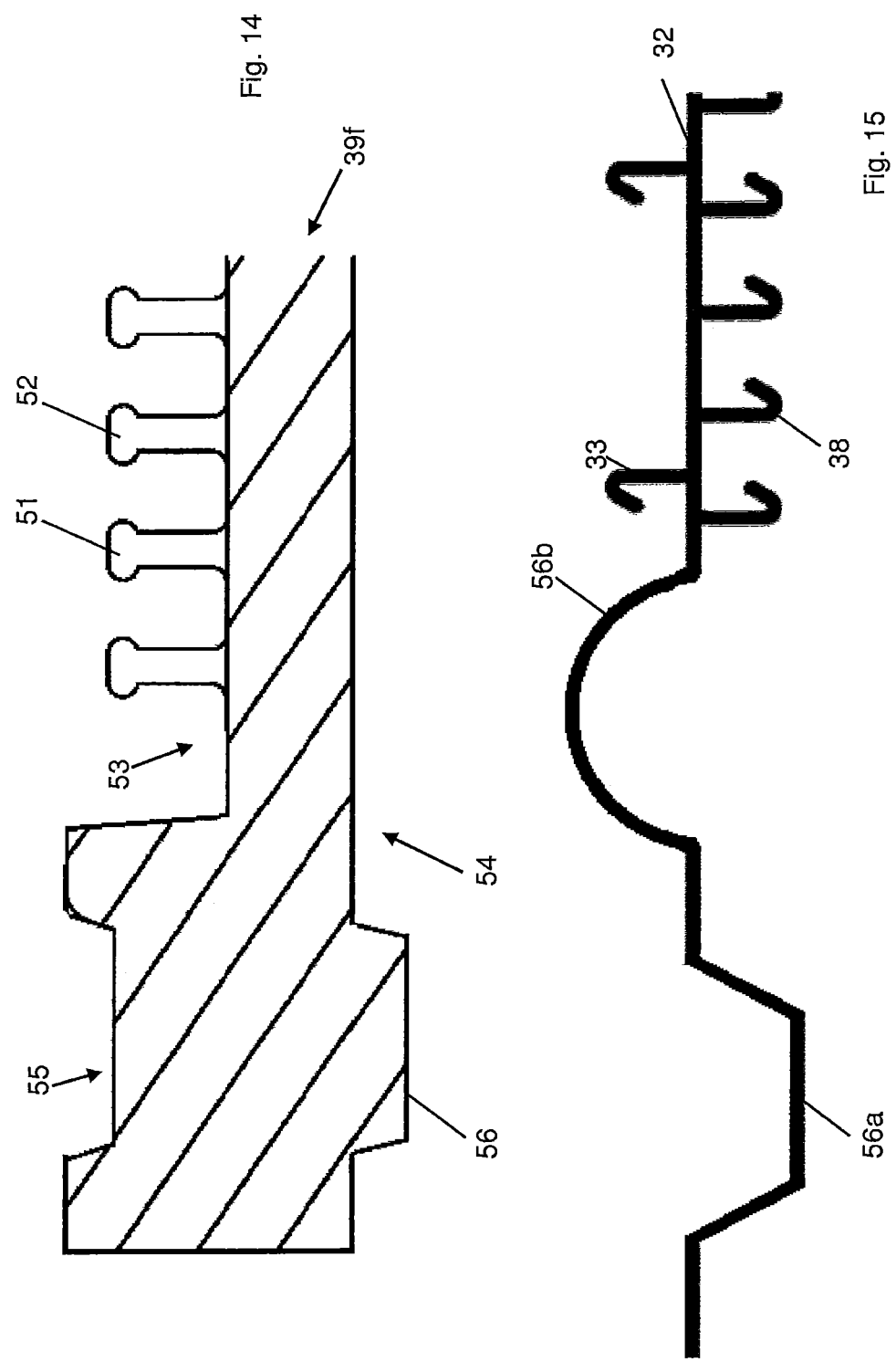

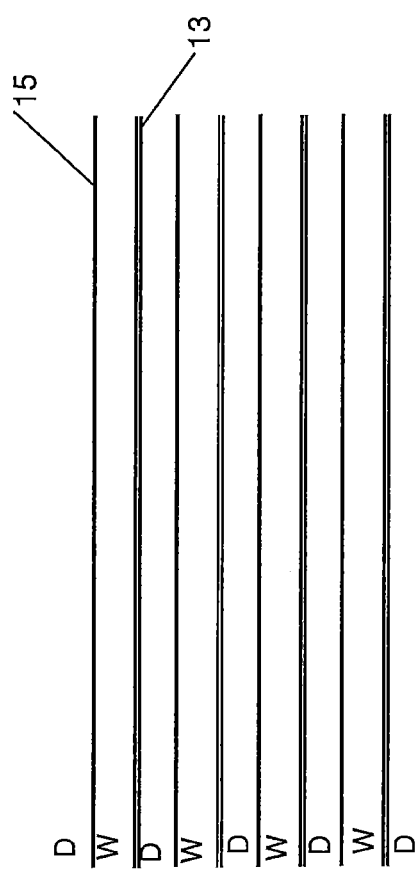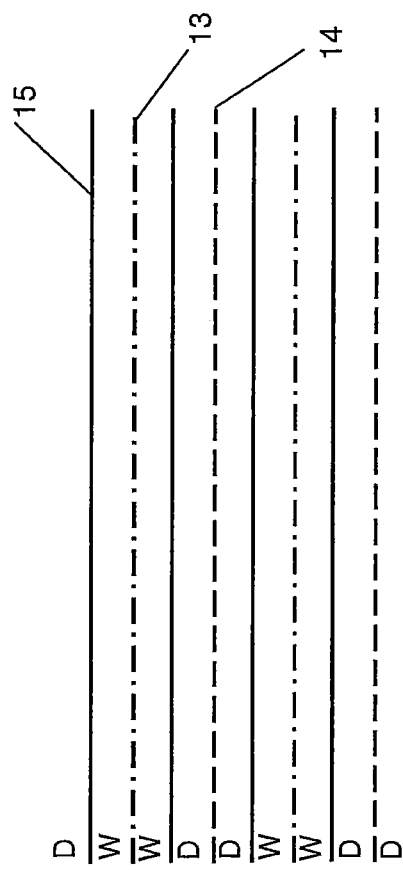

FLOW PLATE FOR A HUMIDIFIER

BACKGROUND

The present application relates to a flow plate for a humidifier, which is preferably used to humidify process gas, and to a humidifier comprising a flow plate of this kind, for example in electrochemical systems. The aforesaid electrochemical systems for example may be fuel cell systems, an electrochemical compressor, an electrolyser, or the like. Besides applications in the field of electrochemical systems, humidifiers can be used for processing air in the field of building technology and air management in vehicles, i.e. in a field summarised by the term "heating, ventilation and air-conditioning" (HVAC).

Humidifiers of this kind are used for example to humidify process gas for fuel cells which are operated with molecular hydrogen and/or oxygen or air for electricity generation. The proton exchange membranes usually used for the operation of fuel cells of this kind require conditions that are as stable as possible with regard to temperature and moisture in order to increase durability and in order to improve efficacy. The process gases supplied to the fuel cell are for this reason usually set to a desired, stable humidity in a humidifier. A humidifier of this kind comprises flow plates which are usually provided with channel structures, wherein the channels adjoin a water transfer medium, typically in the form of a water-permeable membrane.

An assembly of this kind usually provides a plurality of flow plates, between which there are arranged water transfer membranes. An important property of the membranes lies in the fact that they are gas-impermeable, but allow the exchange of moisture between the water transfer membrane and the gas surrounding them.

For example, it may be provided that on one side of a water transfer membrane a moister gas is guided through the channels of an adjacent flow plate, and on the opposite side of the water transfer membrane a drier gas is passed through channels of a second flow plate. In this case, the moister gas on one side of the water transfer membrane gives off moisture to the membrane, whereas on the opposite side the membrane gives off moisture to the drier gas.

The water transfer membrane accounts for a significant proportion of the costs in the production of the described humidifier, and therefore it is usually sought to minimise the area of the water transfer membranes and thus in any case also the area of the flow plates. The efficient guidance of the gas through the channels of the flow plates is therefore of pivotal importance, because a predefined humidity of the gas by transfer of moisture across the membrane must be set reliably over an exchange area minimised to the greatest possible extent.

In this regard, a design of the channels within flow plates of a humidifier that has a favourable influence on the flow of the gas and thus allows a comprehensive moisture exchange with the water transfer membrane is known from the prior art, for example the German utility model specification DE 20 2014 006 480 U1.

SUMMARY

The present innovation, against the background of the prior art, addresses the problem of creating flow plates for a humidifier which enable the exchange of moisture with a water transfer membrane even more efficiently. In particular, the water exchange should be prevented from taking place only between the planes close to the membrane.

This problem is solved by a flow plate having the features of claim 1. Claims 2 to 26 relate to advantageous embodiments of a flow plate of this kind, and claims 27 to 29 relate to a humidifier comprising flow plates of this kind.

Accordingly, the innovation relates to a flow plate for a humidifier, which flow plate has a flow field with a plurality of freestanding support elements, wherein the support elements extend, at least in sections, perpendicular to the flat surface plane of the flow plate.

In this context, a flow field shall be understood to mean a region on the flow plate that is designed such that a gas flows along the surface of the flow plate in this region during operation. This flow field, in contrast to the prior art, is not divided into channels delimited from one another, and instead makes it possible for the gas to flow along different paths along the surface of the flow plate, wherein the space that in the prior art is divided at least partially by channel walls has a plurality of freestanding support elements. These can extend for example in a column-like or bar-like manner from the flat surface plane of the flow plate into the space extending along the flow plate, for example between the flow plate and an adjacent water exchange membrane. The flow plate is usually formed flat, such that the flat surface plane of the flow plate is defined as a plane that is parallel to the two main directions of extent of the flow plate, which are arranged perpendicular to one another and which, in the case of rectangular flow plates are usually parallel to the plate edges. The flow field may thus encompass a space a few millimetres tall and parallel to the flow plate, the enveloping contour of said space being formed by the support elements.

The support elements for example may be formed in such a way that, with use of the flow plate, they contact an adjacent water exchange membrane. Since the support elements are freestanding, a partial gas flow along the flow plate can pass a support element on each of the two sides. On the whole, gas flow conditions that enable an optimised distribution of the gas flow in respect of a maximum throughput are thus created at the flow plate, wherein, as a result of the plurality of support elements, the formation of a laminar flow is at least partially hindered or wholly avoided. This results in a good exchange of the gas that flows directly along the surface of the flow plate in individual regions with the gas that flows further away from the flow plate, parallel thereto, in individual regions, for example on a water transfer membrane. An improved transport of moisture away from the water transfer membrane into the flowing gas or in the opposite direction in the case of a dehumidification of the gas is thus made possible.

It may additionally be provided that the support elements are resilient perpendicular to the flat surface plane. As a result of the resilient yield of the support elements, manufacturing tolerances can thus be compensated for effectively, such that for example all or most of the support elements can bear against an adjacent water exchange membrane elastically and for example a small oversize does not result in any damage to the water exchange membrane. Furthermore, the elasticity of the support elements makes it possible to absorb pressure shocks during operation, such that here as well no damage is caused to the water exchange membrane. The elasticity of the support elements in a direction perpendicular to the flat surface plane of the flow plate can be achieved by material elasticity and/or by dimensional resilience, in that the support elements are thus either compressible within themselves or are deformable as a whole.

A further advantageous embodiment may provide that the support elements each have a specific width B parallel to the flat surface plane of the flow plate and a specific length L likewise parallel to the flat surface plane of the flow plate, wherein: L≤10·B, preferably L≤3·B, particularly preferably L≤B, and wherein the width B and the length L are each preferably determined at the end of the support elements closest to the flow plate, that is to say for example at the end of the support elements connected to the planar surface of the support plate. As a result, the invention can be implemented effectively for example by column-like or bar-like support elements, which for example have a round, elliptical, square or rectangular cross-sectional form. It is also possible, however, for the support elements to have the form of a rib portion of longer or shorter length with accordingly smaller width. By way of support elements of this kind, the length of which for example is in the order of ten times their width, a gas flow can also be guided, at least in batches, in specific paths over the flow plate or along the flow plate.

A further advantageous embodiment may provide that the support elements each have a specific height H perpendicular to the flat surface plane of the flow plate, wherein: H≤6·L, preferably H≤3·L, particularly preferably HL≤L.

With this parameter choice, relatively narrow column-like forms of support elements can be provided, for example. Accordingly, a very large amount of support elements per unit of area can be arranged on a flow plate, such that a very thoroughly mixed flow of the gas over the flow plate is made possible with, accordingly, good moisture exchange with a water exchange membrane.

Here, with use in a humidifier, the space between the flow plate and an adjacent water exchange membrane is usually relatively narrow, since the distance between the flow plate and the adjacent water exchange membrane is selected to be small. For example, it may be provided that the support elements each have a specific height H perpendicular to the flat surface plane of the flow plate, wherein H≤3.0 mm, preferably H≤1.0 mm, particularly preferably H≤0.5 mm.

In the assembled state of a humidifier, the support elements may contact, either wholly or partially, i.e. all support elements or some of them, an adjacent water exchange membrane or a support medium holding same. The region of the membrane covered by the ends of the support elements that bear directly against the water exchange membrane requires particular attention, since in this region the gas passing through can come into contact with the water exchange membrane only to a limited extent.

Often, supports are provided on the water exchange membrane in the region of the covering, which supports may also be part of the support medium or may be identical thereto and enable moisture exchange with the water exchange membrane even in this region on account of the fact that they are arranged between the water exchange membrane and the support elements. A support medium of this kind for example may be a (graphite) fibre paper, a multi-ply (graphite) fibre fabric, a non-woven, or another woven or multi-ply fabric made of natural and/or synthetic fibres. The support medium for the water exchange membrane is usually gas-permeable.

The water transfer medium, which may also be called a water transfer membrane or water exchange membrane, may be for example a porous medium, a coated or impregnated fabric (Texapor®, Venturi®), a membrane laminate (Goretex®), an ion-saturated membrane, an ionomer membrane (Nafion®), or a diaphragm.

The length of the support elements advantageously may be less than 5 mm, more preferably less than 2 mm, and particularly preferably less than 1 mm. The shorter the support elements are in the longitudinal direction parallel to the flat surface plane of the flow plate, the smaller the number of fixed channels that can be formed for the gas flowing along, whereby the gas flow can propagate and mix more freely. By keeping the dimensions of the support elements short in the direction parallel to the flat surface plane, the areas covered by the support elements at a water exchange membrane arranged in parallel are also reduced and are available only to a reduced extent for exchange of moisture with the gas. By keeping the length and width of the support elements as short as possible, the performance of the moisture exchange per unit of area of the flow plate is increased in the case of use in a humidifier.

In this regard, it may also be provided that, for a specific maximum distance $d_{max}$ of adjacent support elements parallel to the flat surface plane of the flow plate, the following is true: $d_{max}$≤6·L, preferably $d_{max}$≤3·L, particularly preferably $d_{max}$≤L. The maximum distances defined in this way between adjacent support elements ensure a sufficient number of obstacles in the path of the gas flow, such that the laminar flow is broken up at least partially and turbulence is generated at least partially, and at the same time the flow resistance is kept sufficiently low by the minimal dimensions of the support elements.

The individual support elements may be formed here in a rod-shaped or column-shaped manner, at least in sections.

Here, it may additionally be provided that an end of the support elements remote from the flow plate, that is to say remote from the flat surface of the flow plate, is hook-like. As a result of the hook-like design of the free end of the support elements, a region of the support elements that can bear resiliently against an adjacent water exchange membrane or the support medium and at the same time is not pointed or sharp-edged, at least in the region of contact with the water exchange membrane or the support medium, such that the water exchange membrane or the support medium is not damaged or cannot be penetrated by support element, is created at said free end. If the support elements are made of a deformable plastic, the hook-like bent portions can be particularly resilient.

It may additionally be provided that the hook-like end of the support elements is bent towards the flow plate by more than 90 degrees, preferably by more than 105 degrees, particularly preferably by more than 120 degrees relative to a plumb line direction/vertical direction oriented perpendicular to the flat surface plane. A bend of at least 90 degrees generates a part at the end of the support elements that is bent at a right angle and that can bear flat against the water exchange membrane. A further bending of the free ends of the support elements causes the ends of the support elements to be directed back towards the flat surface of the flow plate, whereby the risk of hooking into the water exchange membrane or the support medium and damage to the membrane or the support medium is further reduced.

The individual support elements may also be profiled along their height, and for example taper in a conical or pyramidal manner in respect of the cross-section, starting from the flat surface of the flow plate and with increasing distance therefrom. A variable flow cross-section that is available between the support elements for the gas flowing past is thus created along the height of the support elements. The gas flow is thus braked more strongly in the immediate vicinity of the surface of the flow plate than further distanced from the surface of the flow plate, where the support elements have only a small cross-section and contact a water exchange membrane possibly provided. A pulse can thus be imparted to the gas flowing past, causing it to move and mix also perpendicularly to the flat surface plane.

It may additionally be provided that the density of the support elements per unit of area of the flow plate is variable along the flat surface plane of the flow plate.

For example, the density may change periodically in the main flow direction of the gas in a humidifier. The flow resistance for the gas flowing past is thus modulated, whereby fluctuations in density are achieved and may lead to intensified mixing of the gas. The density may also vary transverse to the main flow direction of the gas, in particular also periodically.

It may additionally advantageously be provided that the support elements are manufactured from plastic, in particular from a thermoplastic, and preferably comprise one or more of the following materials: polyamide, polypropylene, polyethylene, vinyl, polyester, polyether ether ketone, polyether sulfone, polyvinyl sulfone, polyamide imide, polyoxyethylene, polyphthalamide. These materials are plastics materials with which stable and relatively thin support elements in bar or strand form can be produced particularly easily.

It may likewise be provided advantageously that the support elements are produced from metal, in particular from steel, in particular from stainless steel. Here it is advantageous if the entire flow plate is made of the same metal and the support elements are produced in one part with the flow plate. For micro sealing or for protection against corrosion, the flow plate may additionally be coated completely or at least partially, for example by a hydrophilic or a hydrophobic coating.

It may additionally be provided here that the number of support elements per unit of area in at least one flow field of a flow plate is at least 20 $cm^{-2}$, preferably at least 80 $cm^{-2}$, particularly preferably at least 150 $cm^{-2}$. The individual support elements in this case are relatively thin and wire-like and are flexible as a whole, but are rigid enough that they protrude in a brush-like manner from the flat surface of the flow plate and do not become entangled with one another.

To this end, it may also be provided that the support elements are arranged on a mat arranged parallel to the flat surface plane of the flow plate. The support elements and the mat may be manufactured here from the same material.

It may also be provided that the support elements and the mat are formed in one part.

For example, the mat may contain a braiding of strand-like elements, the free ends of which protrude substantially at a right-angle from the mat and form the support elements. The mat may also consist as a whole of a braiding of strand-like elements which form the support elements in the region of their free ends.

The flow plate with its support elements can be fabricated such that there are no openings in the region of the flow fields. Flow plates of this kind are suitable both for use in bipolar designs, in which different gases flow on both surfaces of the flow plate, and for use in monopolar designs, in which identical or comparable gases flow on both surfaces of the flow plate. If, by contrast, the support elements are formed from the flow plate such that openings are thus provided in the region of the flow fields, the flow plates are suitable only for use in monopolar designs. Here, two differently designed types of flow plates are then preferably used alternately.

The flow plate may additionally also be provided with through-openings for conducting a gas through the flow plate perpendicular to the flat surface plane thereof, wherein the flow field is fluidically connected to the through-openings. The flow field in this context is understood to mean the space available for the gas flowing through along the flow plate and occupied by support elements, said space being available between the flow plate and a water exchange membrane arranged parallel thereto in the case that the flow plate is used in a humidifier.

The through-openings preferably run in such a way that they pass through the flow plate and, for example when used in the stack of a humidifier, can be aligned with corresponding through-openings in adjacent flow plates. If different flow plates are thus stacked, a line formed by the aligned through-openings is thus connected to many flow fields of the individual flow plates, in the case of four lines usually in each case to half of the flow fields of the individual flow plates, such that, as a result of the line thus formed, all flow fields either can be loaded with inflowing gas, or the gas flowing out from the individual flow fields can be collected by a common discharge line and can be discharged jointly from the humidifier.

Each individual flow plate can be formed in one piece, however it may also consist of at least two elements connected to one another, wherein one element terminates the flow plate outwardly at the narrow side thereof in a frame-shaped manner, and the other element is inserted into the frame-shaped element. The frame-shaped element may leave one or both flat sides of the mat-like insertable element free, and may merely cover and surround the narrow sides. In this case the mat-like element may have protruding support elements on one of its two flat sides or on both flat sides.

The frame-like element, however, may also be box-shaped and provided with a base, such that the mat-like element can be inserted into the box and leaves free only one flat side of the mat-shaped element and is provided with support elements.

Here, it may additionally be provided that the elements connected to one another are all fabricated from plastic, wherein the elements connected to one another are preferably fabricated from the same plastic. The frame-shaped element may thus consist of plastic in a case of this kind.

It may also be provided, however, that at least two elements connected to one another are made of different materials, wherein the frame-shaped element preferably is made of metal or contains metal. In this case the frame-shaped element obtains an increased mechanical stability as a result of the production from metal or with metal. The other, mat-like element may then also be formed to be rather mechanically weak, for example as a flexible mat.

The invention in particular relates to a flow plate for use in an electrochemical system or in an HVAC system.

Besides a flow plate of the above-explained kind, the innovation also relates to a humidifier having one or more flow plates of the above-described kind, wherein the flow plates are arranged in a stack, and wherein a membrane composite having at least one water membrane is arranged between each two adjacent flow plates of the stack.

If the flow plate is intended for installation in a humidifier of bipolar design, such that different gases flow on both sides of the flow plate, i.e. a gas to be humidified and a gas to be dehumidified, support elements can be provided in both flow fields of the flow plate, wherein it is advantageous to provide a greater number of support elements per unit of area in the flow field of the gas to be dehumidified than in the flow field of the gas to be humidified. It is also possible in principle to provide support elements only in the flow field of the gas to be dehumidified.

In the case of a humidifier of monopolar design, in which the same gas flows on both sides of a flow plate, two different types of flow plates are advantageously arranged alternately. Here, it may be advantageous to provide at least the flow plate for the gas to be dehumidified with the aforementioned number of support elements per unit of area, in particular in both flow fields. By contrast, for the flow plate over the two flow fields of which gas that is to be humidified passes, a smaller number of support elements per unit of area may be advantageous. In individual application scenarios, the flow plates for gas to be humidified may also be formed without support elements.

The water exchange membranes are formed in such a way that they are preferably gastight, such that no gas exchange is possible between the flow fields of different flow plates. For example, the flow fields of adjacent flow plates arranged on different sides of a water exchange membrane can be charged with gases having different moisture contents, in such a way that a moister gas on one side gives off moisture to the water exchange membrane and the drier gas flowing on the opposite side of the same water exchange membrane takes on water from the water exchange membrane. An orderly transfer of moisture from the moister gas to the drier gas within a pair of adjacent flow plates thus occurs.

The membrane composite may also consist here exclusively of a water exchange membrane and may be supported by the support elements protruding on both sides from the flow plates. However, it may also be provided for the water exchange membrane, on one or both sides, to be covered and supported at least partially by a support medium in the form of a gas-permeable material within the frame of the membrane composite. A support membrane of this kind is preferably designed such that it covers a smallest part possible of the surface of the water exchange membrane and hinders access of gas to the surface of the water exchange membrane to the smallest extent possible, but has sufficient mechanical stability to hold the water exchange membrane. A support medium of this kind may be, for example, a (graphite) fibre paper, a multi-ply (graphite) fibre, a non-woven, or another woven or multi-ply fabric made of natural and/or synthetic fibres. The support medium for the water exchange membrane is usually gas-permeable.

It may be provided here that the membrane composite is directly in contact with the support elements of the flow plates between which the membrane composite is arranged. The individual support elements may thus be directly connected to the water exchange membrane or a support medium and on the one hand hold and support the membrane composite or the water exchange membrane, and on the other hand also fix the assembly of flow plates, for example if the support elements constitute part of a mat of the flow plate inserted into a frame-shaped element. It is then for example not absolutely necessary to fix the mats further in the frame-shaped elements of the flow plates.

It may additionally be provided, in a humidifier according to the invention, that the through-openings of the flow plates of the stack are arranged in alignment, such that the through-openings of flow plates form at least four lines, via which gas to be dehumidified can be introduced into the stack, dehumidified gas can be removed from the stack, gas to be humidified can be introduced into the stack, and humidified gas can be removed from the stack.

If the flow plates are formed in one part, the through-openings readily pass through the flow plates. If the flow plates are formed in a number of parts, for example with a frame-shaped element and an inserted mat, the through-openings can thus either pass through the mats or also the frame-shaped elements in a region into which the mats do not extend. For example, the through-openings in the region of the frame can be provided in such a way that the gas can flow from the frame into the narrow sides of the mat. The frame-shaped elements of the flow plate can be formed to be of such a thickness in the stack direction that they bear against one another directly in the formed stack, such that the through-openings are aligned and form an outwardly closed line passing through the stack. The mat-like elements and the water exchange membranes are then arranged and fixed within the frame-shaped elements. The lines formed by the through-openings then have lateral openings, which each open out into an individual flow field.

In the plane of a flow field to which there is no connection from the through-opening in question, and also in the plane of a flow field to which a connection shall be produced from the through-opening in question, a seal can be provided in the relevant flow plate in the direction remote from the flow field in question, which seal can be formed directly in the flow plate, for example in the form of embossed beads in the case of metal flow plates or in the form of bead-groove combinations in the case of flow plates produced at least in part from plastics. It is also possible to guarantee the seal by means of elastomer beads applied to the flow plate.

BRIEF DESCRIPTION OF THE DRAWINGS

The innovation will be presented hereinafter with reference to the figures of a drawing and explained further below. In the drawing:

FIG. 5 shows an enlarged view of the structure of support elements of a flow plate;

FIG. 6 shows a perspective illustration, in enlarged form, of a portion of a flow plate with support elements;

FIG. 7 shows a side view of a flow plate with support elements which extend on both flat sides of the flow plate;

FIG. 10 shows a detail of a flow plate with various groups of support elements which are oriented differently and are arranged in differently oriented rows;

FIG. 11 shows a detail of a flow plate with support elements which are formed hollow and are formed from the basic material of the plate;

FIG. 12 shows a detail of a flow plate with a plurality of split support elements with hook-like ends;

FIG. 13 shows a detail of a flow plate with two adjacent column-like support elements with thickened ends;

FIG. 14 shows the flow plate from FIG. 13 in a side view, wherein a groove and a bead are arranged on mutually opposed flat sides of the flow plate;

FIG. 15 shows a detail of a sectional view of a flow plate with support elements in both flow fields; and FIG. 16 shows, in two partial images, schematic illustrations of the monopolar and bipolar design of humidifier modules or humidifiers.

DETAILED DESCRIPTION

Figure 1:
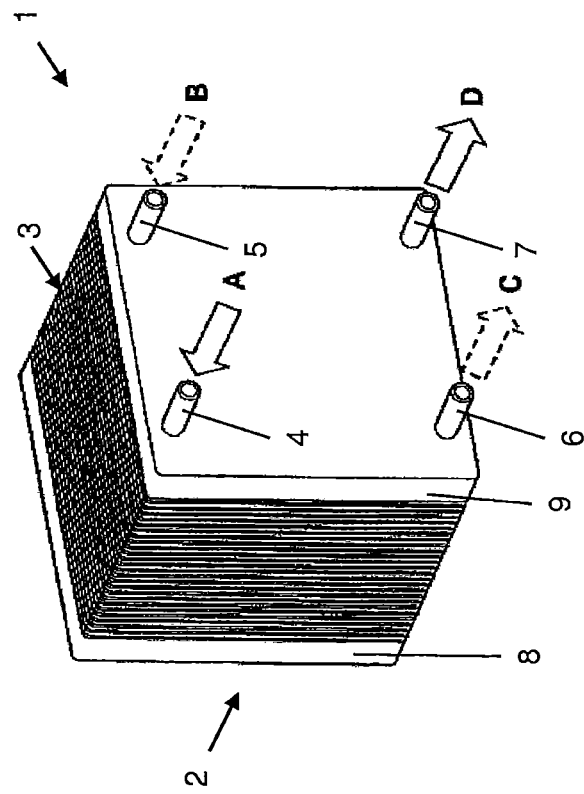
FIG. 1 shows a perspective illustration of a humidifier with a plurality of flow plates.

FIG. 1 shows, in a perspective illustration, a block-shaped humidifier 1 with humidifier modules 3 which are stacked in the stack direction 2 and which each contain at least one flow plate and one water exchange membrane, wherein the humidifier modules are connected to one another by through-openings which are aligned in the stack direction 2 and which open out into outwardly guiding gas ports 4, 5, 6, 7. Gas ports 4, 5, 6, 7 penetrate through one of the end plates 8, 9 of the humidifier 1. The gas inlets are provided here with the reference signs 4 and 5, and the gas outlets are provided with reference signs 6 and 7. The corresponding gas flow directions are denoted by A, B, C, D.

The individual humidifier modules 3 stacked in the humidifier 1 each have the same outer dimensions, such that the stack forms a cube with flat side faces.

Figure 2:
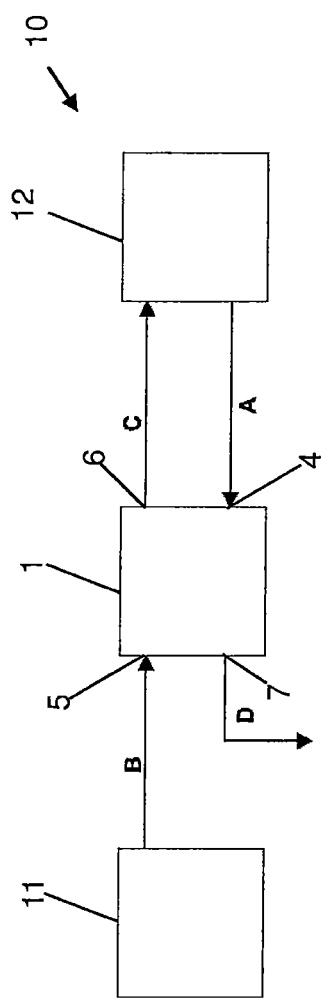
FIG. 2 schematically shows an electrochemical system with a compressor, a humidifier, and a fuel cell stack.

FIG. 2 schematically shows an electrochemical system 10 with a compressor 11, a humidifier 1, and a fuel cell stack 12, which for example comprises a plurality of hydrogen/oxygen fuel cells. A dry process gas to be humidified, for example molecular hydrogen or molecular oxygen or air, is supplied by the compressor to the humidifier 1 via a first inlet 5 of the humidifier 1. The process gas humidified in the humidifier 1 is then delivered via a first outlet 6 of the humidifier 1 to the fuel cell stack 12. There, the chemical energy of different process gases is converted into electrical energy by means of a plurality of membrane electrode units. The water created during the reaction of the process gases in the fuel cell stack 12 is supplied to the humidifier 1 via a second inlet 4 and is used there to humidify the dry process gas, which is supplied to the humidifier 1 via the first inlet 5, through a water exchange membrane. The dehumidified gas is delivered for example to the surrounding environment via a second outlet 7 of the humidifier 1.

The capital letters from FIG. 2 correspond to the gas flow directions which are also denoted in FIG. 1 and are explained in the corresponding text in conjunction with the gas ports.

Figure 3:
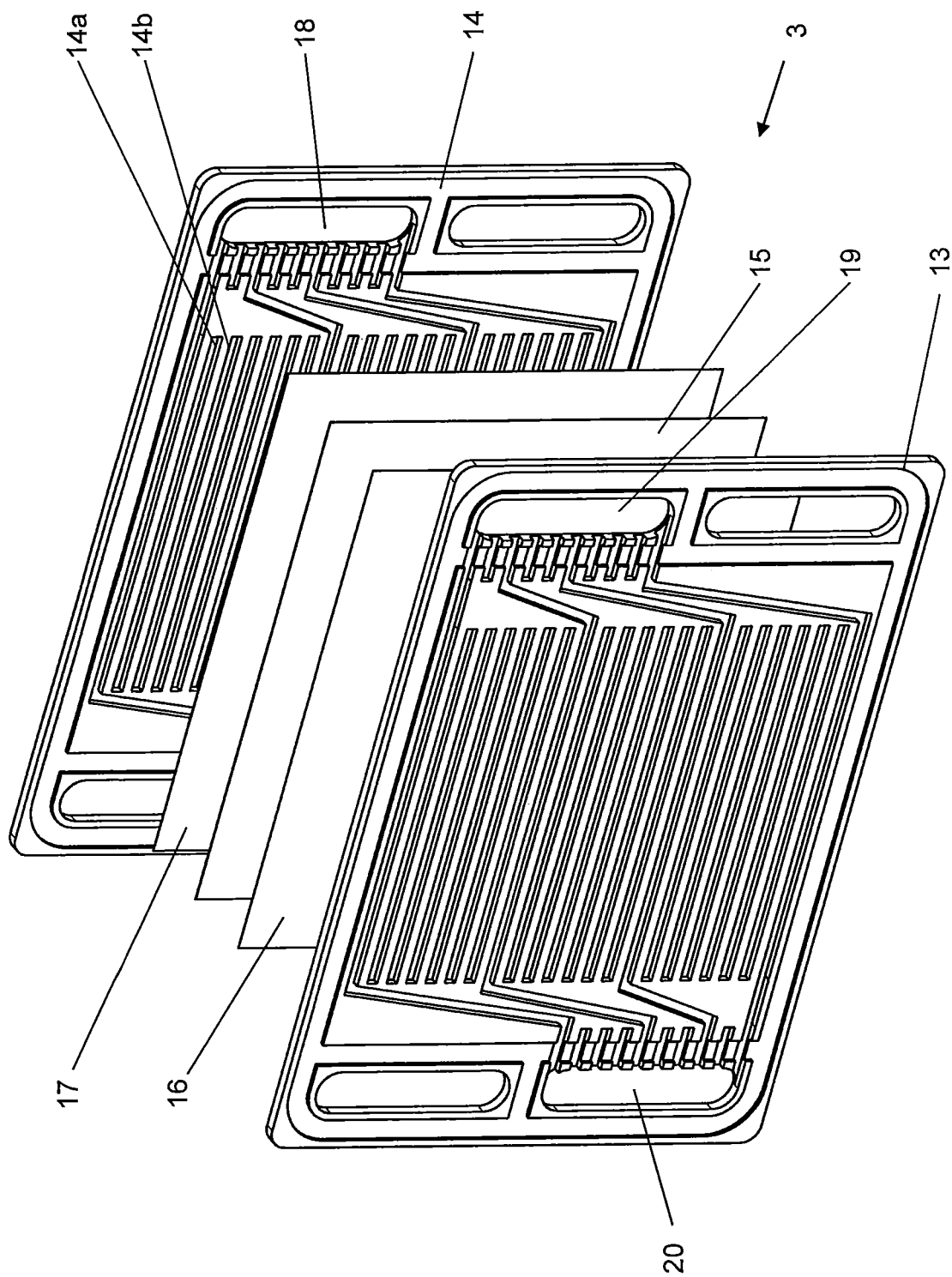
FIG. 3 shows a module with two flow plates.

FIG. 3 shows, in a perspective illustration, a humidifier module 3 known from the prior art and comprising, in the described case, two flow plates 13, 14 and a water exchange membrane 15 arranged therebetween, and two support media 16, 17 in the form of non-woven fabrics supporting the water exchange membrane 15 on both sides.

The flow plates 13, 14 each have channels at least on one of their sides, said channels being separated from one another by ribs 14a, 14b. The ribs 14a, 14b separating adjacent channels from one another can contact the support media 16, 17, such that channels closed on all sides are created for the flow of a gas along the flow plate within the humidifier module 3. Gas is supplied to the individual flow plates via the through-openings 18, 19 and can be removed again via further through-openings 20 after having passed through the corresponding flow plate. Each flow plate 13, 14 for this purpose has four through-openings in the shown example, wherein in each case two of these are arranged mutually oppositely and are associated with one flat side of the flow plate. The two other through-openings are in each case associated with the opposite flat side and the channels running there, although these are not visible in FIG. 3. The flow plates 13, 14 are, when a humidifier is assembled, stacked in such a way that the through-openings 18, 19 are aligned with one another and form a line for supplying gas to all flow plates. On the opposite side, a further line for removing gas from the flow plates is formed by the aligned through-openings.

Where the ribs 14a, 14b contact the support media 16, 17, the moisture exchange between the membrane composite consisting of the water exchange membrane 15 and the support media 16, 17, and the channels on the flow plates is limited. This solution from the prior art shown in FIG. 3 therefore constitutes a non-optimised embodiment which is to be improved by the present innovation.

Figure 4:
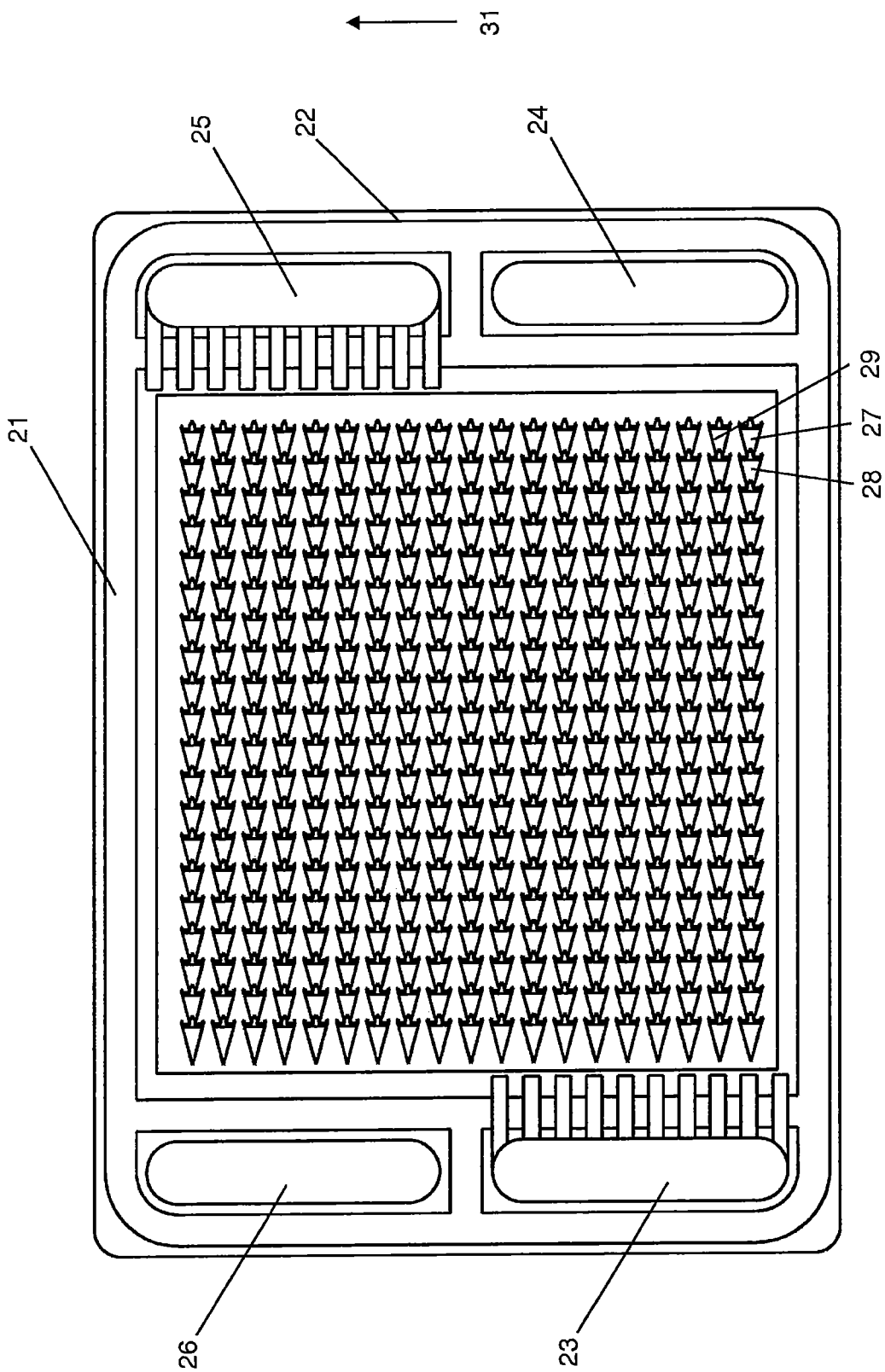
FIG. 4 shows a view of an individual flow plate.

FIG. 4 shows a view of a flat side 21 of a flow plate 22 with through-openings 23, 24, 25, 26. There are no continuous channels formed between the through-openings 23 and 25 on the shown flat side 21 or the through-openings 24 and 26 on the flat side of the flow plate facing away from the viewer, as would be the case for example with ribs running continuously accordingly, as are known from the prior art. Instead, support elements 27, 28, 29 are formed on the flat side 21 of the flow plate 22, wherein a free space through which gas can flow is formed between each two support elements. The support elements 27, 28, 29 are arranged regularly in rows, wherein first, equal distances are provided between the support elements 27, 28 along a first direction 30, whereas in the second direction 31 second, likewise equal distances are provided between adjacent support elements 27, 29. The gas that flows through the flow plate 22, or more precisely which flows along the flow plate 22 in the region of the support elements 27, 28, 29, finds its flow path between the through-opening 23 and the through-opening 25 and can flow through between adjacent support elements in each direction.

The flow plate 22 is a flow plate for use in a humidifier or a humidifier module 3 for an electrochemical system, in particular for a fuel cell system or for an HVAC system.

The flow plates 22 according to the invention, similarly to the flow plates 13, 14 from the prior art, are connected to membranes, which in each case consist of the water exchange membrane 15 and optionally support media 16, 17, and are joined together to form humidifier modules.

The individual support elements are shown in greater detail by way of example in FIG. 5. Each individual support element 27 has a strip-like part 27b, which tapers in a triangular manner from a base 27b to a tip and extends substantially perpendicularly away from the flow plate 22. The triangular tip of the strip 27b is bent by approximately 135 degrees. The triangular strips 27b are cut or stamped out from the base area of the flow plate 22, such that triangular openings 27c there remain free accordingly. The production of the support elements 27 by means of cutting or stamping can be used both for metal flow plates and for flow plates made of plastic material. Corresponding shapes can also be produced however by injection moulding, in particular in the case of flow plates made of plastic material. By means of the dimensions of the individual support elements 27 and the density of the support elements on the flow plate 22, a structure is produced that in practice hinders or prevents a continuously laminar flow between the through-openings 23, 25. Flows and turbulence occur as a gas moves and enable an exchange of the gas at least partially also perpendicular to the flow plate 22 and therefore a strong exchange of moisture between the water exchange membrane and the entire space disposed between the latter and the flow plate 22.

FIG. 6 shows another embodiment of a flow plate 32, from which rectangular strips 33 are stamped or cut out and bent up, wherein the free ends 33b extend from a base 33c through approximately 135 degrees relative to a straight part 33a extending perpendicularly away from the flow plate 32. In the example shown in FIG. 6 the support elements 33, 34 are arranged equidistantly, wherein they are arranged more densely in a first direction 35 than in a second direction 36. This arrangement may also be produced by injection moulding. It is also possible, in such a configuration, to form the flow plate 32 as a flexible mat from a woven fabric from which individual threads or wires protrude perpendicularly, similarly to the shown support elements 33, 34, wherein the individual threads or wires may likewise have bent end regions. An approximately brush-like structure is thus created, wherein the ends of the support elements constituting the brush bristles may each be bent in a hook-shaped manner. However, a simple brush-like structure of the support elements without the free ends being bent over is also conceivable in order to form a corresponding flow plate.

FIG. 7 shows, in a side view, the arrangement of the support elements 33, wherein it is clear that support elements 33, 38 protrude from the flow plate 32 on both flat sides. A membrane composite having a water exchange membrane can then be arranged on both sides of the flow plate 32, such that gas for humidification and/or dehumidification can flow along both sides of the flow plate 32.

The flow directions of the gases flowing along one of the two sides of a flow plate 32 each can be the same or also different, in particular exactly opposite.

A flow plate 32 can also be formed in such a way that it for example comprises a woven fabric mat, from which free wire or thread ends extend perpendicularly in both directions on the flat sides, such that a brush-like structure is created on each of the two sides of the flow plate. A membrane composite or a water exchange membrane can be placed directly against each of these brush-like structures of support elements.

A flow plate can, however, also have an at least two-part form, wherein a rigid frame with or without a base is provided, into which a corresponding mat of the above-described type with threads or wires extending away therefrom freely can be inserted. For example, a woven fabric can be used as a mat of the described type, as is used within the scope of a connection partner of a known hook-and-loop system. However, it is also possible for example that the individual support elements have the form of an elongate or round closed loop.

Figure 8:
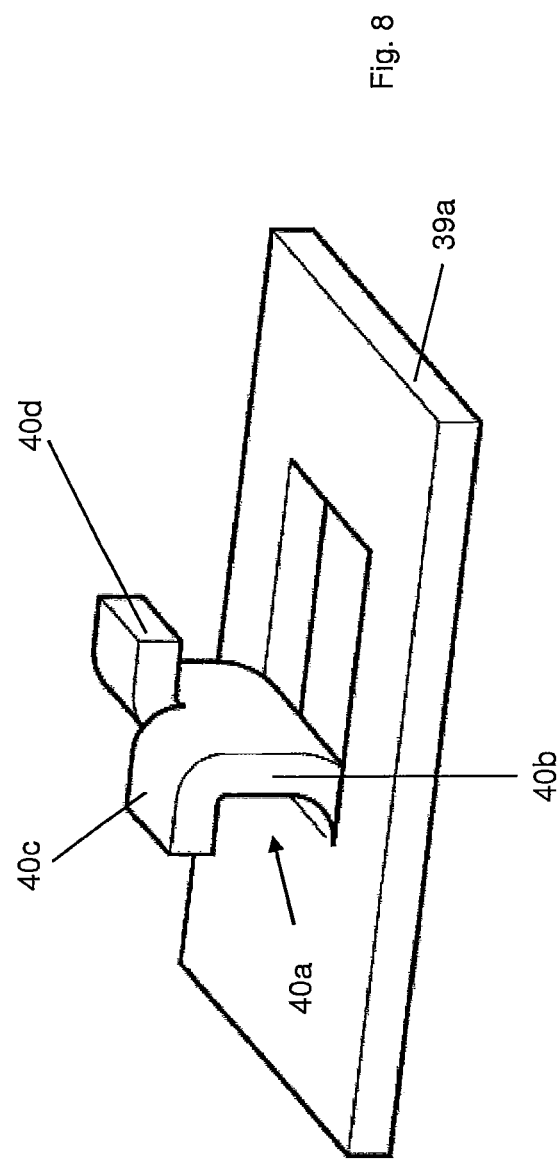
FIG. 8 shows a detail of a flow plate with a support element which splits towards its free end and has two hook-shaped free ends bent in different directions.

FIG. 8 shows schematically, in a perspective view, a portion of a flow plate 39a, from which a support element 40a is cut out or punched out and bent up. The support element 40a has a straight portion 40b, which extends perpendicularly away from the flat surface of the flow plate 39a. At the end of the portion 40b, this is cut or split into two free ends 40c, 40d, which are bent in opposite directions perpendicularly from the straight portion 40b. The bent free ends 40c, 40d form a contact face for an adjacent water exchange membrane or a membrane composite.

Figure 9:
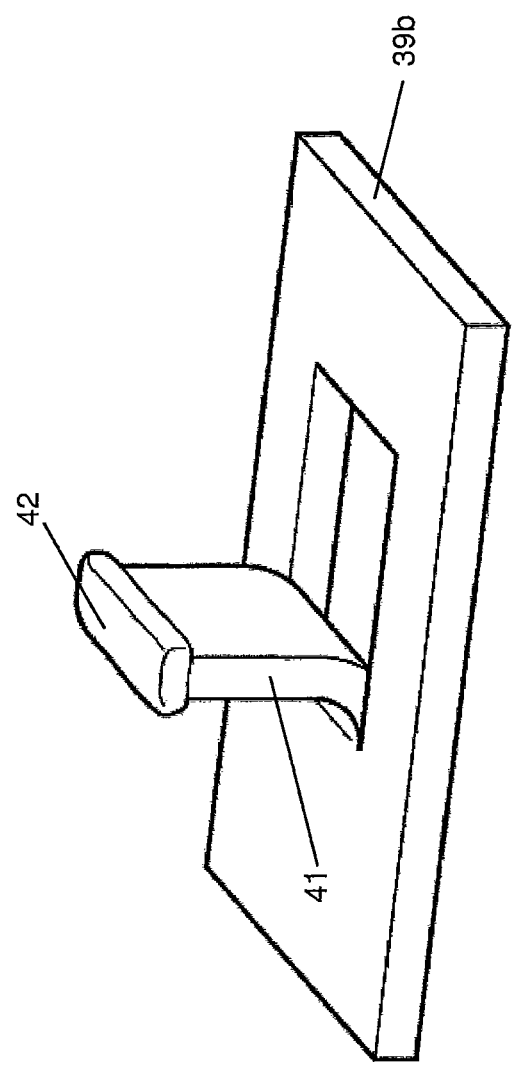
FIG. 9 shows a detail of a support plate with a support element which has a thickened portion at its free end.

FIG. 9 shows a flow plate 39b from which a support element 41 is cut out and bent up. The support element 41 has a thickened portion 42 at its free end.

FIG. 10 shows a flow plate 39c, on which a plurality of rows of identical support elements 43, 44, 45, 46 are arranged, wherein the support elements are arranged in groups in various rows, and the rows do not run parallel to one another, but at an angle between 0 and 90 degrees. The orientation of the bent-over portions 45a at the ends of the support elements is also different. In this way, irregularities are created, which at least partially avoid the formation of stationary flows over the flow plate.

FIG. 11 shows a flow plate 39d, from which support elements 47, 48 are formed for example by deep drawing, wherein the individual support elements 47, 48 are in each case formed cylinder-symmetrically and have a crater-like opening. On their outer side, the individual support elements 47, 48 taper initially starting from the flat surface of the flow plate 39, so as to then widen again at a further distance from a thinnest point. An hourglass-shaped contour is thus provided in a longitudinal section.

FIG. 12 shows a flow plate 39e, with support elements 49, 50 raised from the flat surface thereof, which in principle have a form similar to the support elements 40a known from FIG. 8, but are not obtained by cutting out from the flow plate 39e, but instead by having been placed on the flow plate additively, for example by being moulded on. It is also possible to mould the flow plate 39e together with the support elements 40 by means of injection moulding.

Similarly, FIG. 13 shows a flow plate 39f, with support elements 51, 52 having pommel-like thickened portions at their free ends being raised from the planar surface of said flow plate and being formed similarly to the support elements 41 from FIG. 9, but likewise not obtained by cutting out from the flow plate and bending up, but instead by having been added to the flow plate, for example by a joining process or by being moulded on. It is also possible to mould the flow plate 39f together with the support elements 41 by means of injection moulding.

Whereas the exemplary embodiments in FIGS. 4 to 6 and 8 to 11 have openings, such as the openings 27c, the exemplary embodiments in FIGS. 12 and 13 are formed without openings. Exemplary embodiments in FIGS. 12 and 13 are therefore particularly suitable for a bipolar design of a humidifier, in which different gases flow over both surfaces, i.e. in both flow fields of the flow plate. They can also be used, however, for monopolar designs of humidifiers. If openings are provided, it is by contrast not possible to separate the gases on both surfaces of the flow plate, and therefore these flow plates can be used only for a monopolar design of a humidifier, in which only identical gases are provided on both surfaces of a flow plate.

Compared to the prior art, a flow plate according to the innovation and a humidifier composed from a plurality of such flow plates allow a more efficient humidification of gas with a small spatial requirement.

FIG. 14 shows the flow plate 39f according to FIG. 13 in a side view. Again, a plurality of support elements 51, 52 can be seen, which are arranged at regular distances on a first flat side 53 of the flow plate 39f and protrude perpendicularly from the flat surface plane of the flow plate 39f. On the first flat side 53, the flow plate 39f also has a groove 55 in a projecting region, which groove for example can run fully around the flow field comprising the support elements 51, 52. On the second flat side 54, the flow plate 39f has a bead 56. A bead 56 and the groove 55 are arranged in such a way that a perpendicular projection of the groove 55 on the flat surface plane of the flow plate 39f encompass a perpendicular projection of the bead 56 on the flat surface plane of the flow plate 39f. In other words, the groove 55 and the bead 56 are arranged in a manner complementary to one another in such a way that a plurality of flow plates of identical design in the form of the flow plate 39f can be stacked in such a way that the beads 56 of the plates 39f are received or at least partially received in the grooves 55 of the adjacent flow plate.

FIG. 15 shows a side view of a flow plate 32 comparable to the flow plate from FIG. 7 with the hook-like support element 33 on the upper side of the flow plate 32 and with the hook-like support element 38 on the lower side of the flow plate 32. The flow plate 32 is formed without openings, such that it can be used for a bipolar system, in which different gases flow in both flow fields. The flow plate 32 has a much smaller number of support elements 33 than the number of support elements 38 within the shown portion. The flow plate 32 is thus particularly suitable for a humidifier in which gas to be humidified is guided on the upper side of the flow plate and gas to be dehumidified is guided on the lower side of the flow plate. The exemplary embodiment of FIG. 15 also has a double bead as seal element, wherein the two beads 56a, 56b point in different directions and therefore enable a sealing in both directions. The illustration has an angled bead 56a and a rounded bead 56b in order to illustrate that different bead forms are possible, however only similar bead forms are usually combined within a single component. Here, the flow plate 32 is formed as a metal embossed part, and the support elements 33, 38 are formed by means of cutting and bending from the plate, but do not lie in the plane of the illustration, but therebehind. The beads 56a, 56b are embossed directly in the metal flow plate 32, and have a greater height than the support elements 33, 38, since the humidifier membrane usually has a smaller thickness in the region to be placed against the sealing element than in the region in which it rests on the support elements.

In FIG. 16A a bipolar design of a humidifier module or of a detail of a humidifier is shown. Here, flow plates 13 and water exchange membranes 15 alternate, and a drier gas to be humidified ("D") runs over one surface of a flow plate, and a moister gas ("W") runs over the other surface of a flow plate and gives off moisture via the water exchange membrane to the drier gas ("D") flowing on the other side of the water exchange membrane.

FIG. 16B by contrast shows a monopolar design of a humidifier module or a detail of a humidifier, which has two different flow plates 13, 14. The flow plates 13 are arranged between two flow spaces of moist gas ("W"), and the flow plates 14 are arranged between two flow spaces of drier gas ("D"). The flow plates 13, 14 each have passages, such that the two adjacent flow spaces are not fully separated from one another.

LIST OF REFERENCE SIGNS 1 humidifier
2 stack direction
3 humidifier module
4, 5, 6, 7 gas ports
8, 9 end plates
10 electrochemical system
11 compressor
12 fuel cell stack
13, 14 flow plates
14a, 14b ribs
15 water exchange membrane
16, 17 support medium
18, 19, 20 through-openings
21 flat side of 22
22 flow plate
23, 24, 25, 26 through-openings
27, 28, 29 support elements
27a base of 27
27b triangular strip
27c opening
30, 31 direction arrow
32 flow plate
33 support element
33a straight strip of 33
33b end bent in a hook shape
33c base of 33
34 support element
35, 36 direction arrow
38 support element
39a-f flow plate
40a-d support element
41 support element
42 thickened portion
43-52 support element
53, 54 flat sides of 39f
55 groove
56, 56a, 56b bead
57, 58 flat sides of 32
59, 60 bead

The invention claimed is:

1. A flow plate for a humidifier comprising:
a flow field with a plurality of freestanding support elements,
wherein the support elements extend, at least in sections, perpendicularly to a flat surface plane of the flow plate, and the support elements are comprised of metal,
wherein the support elements are elastic and deform in a direction perpendicular to the flat surface plane of the flow plate when contacted by another layer of the humidifier.

2. The flow plate according to claim 1, wherein the support elements are resilient perpendicular to the flat surface plane.

3. The flow plate according to claim 1, wherein the support elements each have a specific width B parallel to the flat surface plane of the flow plate and a specific length L parallel to the flat surface plane of the flow plate, wherein: L≤10 B, and wherein the width B and the length L are each determined at the end of the support elements facing the flow plate.

4. The flow plate according to claim 3, wherein the support elements each have a specific height H perpendicular to the flat surface plane of the flow plate, wherein: H≤6 L.

5. The flow plate according to claim 1, wherein the support elements each have a specific height H perpendicular to the flat surface plane of the flow plate, wherein: H≤3.0 mm.

6. The flow plate according to claim 3, wherein: L≤5.0 mm.

7. The flow plate according to claim 3, wherein, for a specific maximum distance $d_{max}$ of adjacent support elements parallel to the flat surface plane of the flow plate, the following is true: $d_{max}$≤6 L, and the specific maximum distance $d_{max}$ of adjacent support breaks up laminar flow.

8. The flow plate according to claim 1, wherein the support elements are formed in a rod-shaped manner, at least in sections.

9. The flow plate according to claim 1, wherein an end of the support elements remote from the flow plate is hook-like.

10. The flow plate according to claim 9, wherein the hook-like end of the support elements is bent towards the flow plate by more than 90 degrees, relative to a plumb line direction oriented perpendicularly to the flat surface plane.

11. The flow plate according to claim 1, wherein the support elements are arranged at periodic distances from one another.

12. The flow plate according to claim 11, wherein the support elements are arranged at periodic distances from one another parallel to the flat surface plane of the flow plate along a first direction and along a second direction.

13. The flow plate according to claim 12, wherein a first distance between adjacent support elements determined along the first direction is different from a second distance between adjacent support elements determined along the second direction.

14. The flow plate according to claim 13, wherein the first direction and the second direction are perpendicular to one another.

15. The flow plate according to claim 1, wherein the flow field has a plurality of freestanding support elements, wherein the support elements extend on both surfaces of the flow plate.

16. The flow plate according to claim 1, wherein the number of support elements per unit of area in at least one flow field of a flow plate is at least 20 $cm^{-2}$.

17. The flow plate according to claim 1, wherein the support elements are arranged on a mat which is arranged parallel to the flat surface plane of the flow plate.

18. The flow plate according to claim 17, wherein the support elements and the mat are fabricated from the same material.

19. The flow plate according to claim 18, wherein the support elements and the mat are formed in one part.

20. The flow plate according to claim 1, further comprising through-openings for conducting a gas through the flow plate, wherein the flow field is fluidically connected to the through-openings.

21. The flow plate according to claim 1, wherein the flow plate is formed in one piece, and the support elements are formed by cutting the flow plate and bending the cut support elements away from the flow plate.

22. A flow plate for a humidifier comprising:
a flow field with a plurality of freestanding support elements, and
the support elements extending, at least in sections, perpendicularly to a flat surface plane of the flow plate, the support elements being elastic and deforming in a direction perpendicular to the flat surface plane of the flow plate when contacted by another layer of the humidifier,
wherein the flow plate consists at least of two elements connected to one another, a first element comprised of metal terminates the flow plate outwardly in a frame-shaped manner, and a second element comprised of plastic is inserted into the first element.

23. The flow plate according to claim 22, wherein the support elements extend from the second element and the support elements are comprised of plastic.

24. The flow plate according to claim 22, wherein the support elements comprise a thermoplastic and one or more of the following materials: polyamide, polypropylene, polyethylene, vinyl, polyester, polyether ether ketone, polyether sulfone, polyvinyl sulfone, polyamide imide, polyoxyethylene, polyphthalamide.

* * * * *